U. WEDGE.
DEVICE FOR SEPARATING MATTER FROM A FLUID CONTAINING THE SAME.
APPLICATION FILED OCT. 26, 1916.

1,267,024.

Patented May 21, 1918.
6 SHEETS—SHEET 1.

INVENTOR
UTLEY WEDGE
BY HIS ATTORNEY
Harry Smith

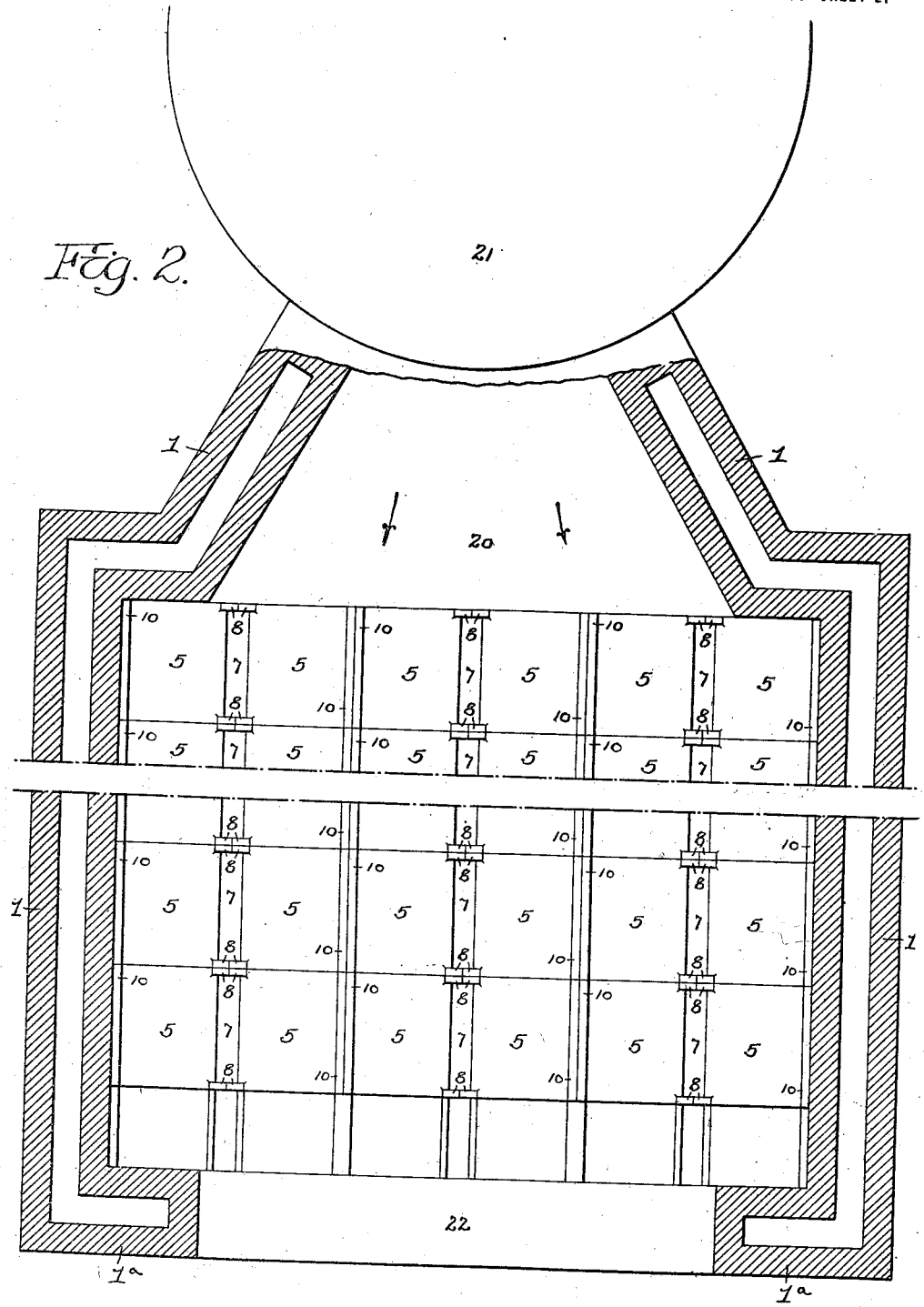

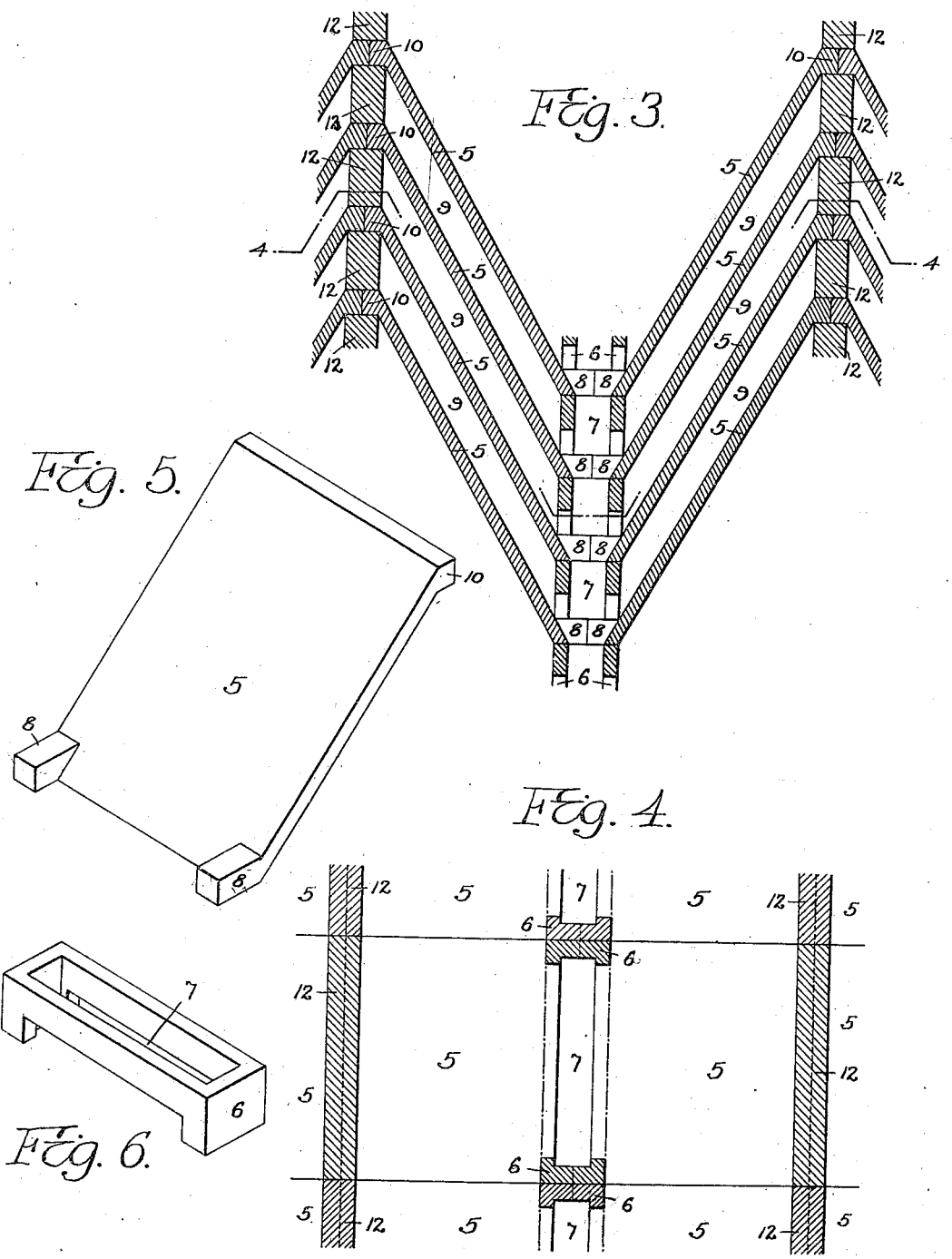

U. WEDGE.
DEVICE FOR SEPARATING MATTER FROM A FLUID CONTAINING THE SAME.
APPLICATION FILED OCT. 26, 1916.
1,267,024.
Patented May 21, 1918.
6 SHEETS—SHEET 4.
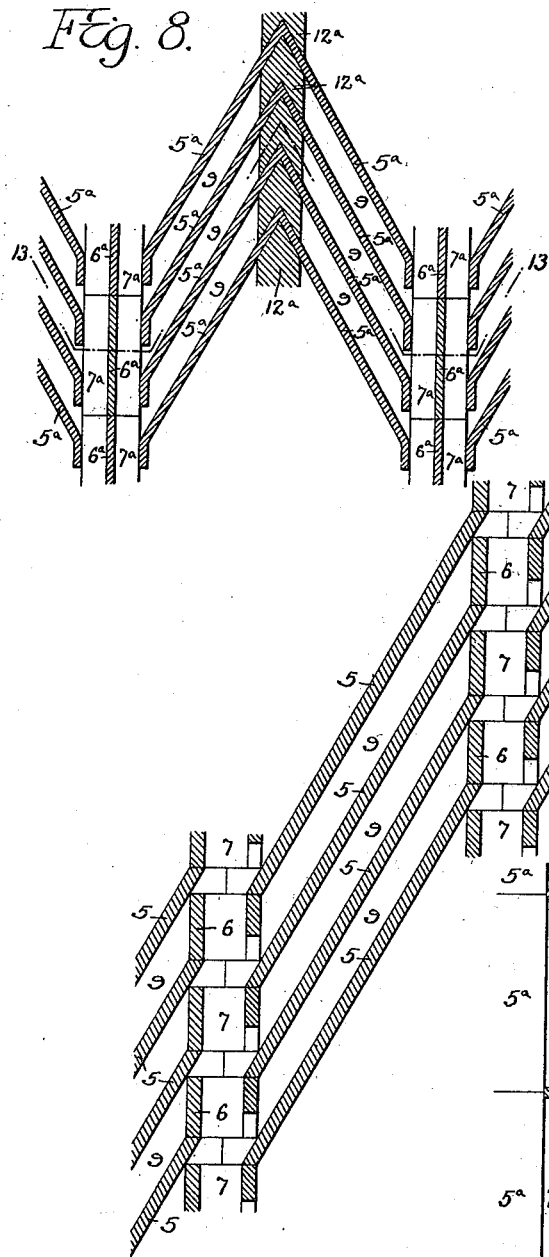
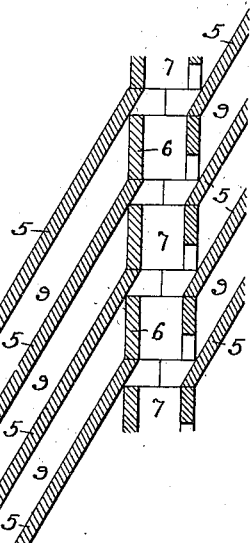
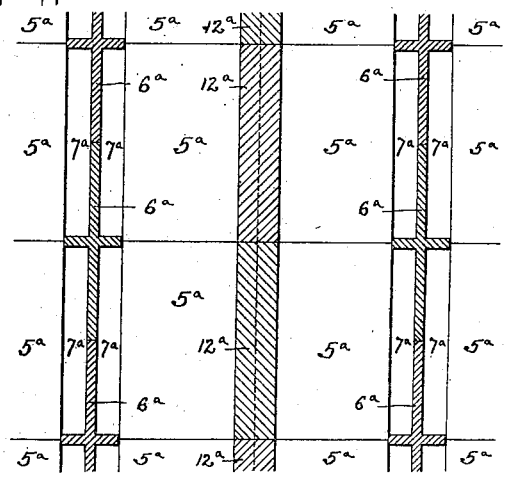
INVENTOR UTLEY WEDGE
BY HIS ATTORNEY Harry Smith U. WEDGE.
DEVICE FOR SEPARATING MATTER FROM A FLUID CONTAINING THE SAME.
APPLICATION FILED OCT. 26, 1916.
1,267,024.
Patented May 21, 1918.
6 SHEETS—SHEET 5.
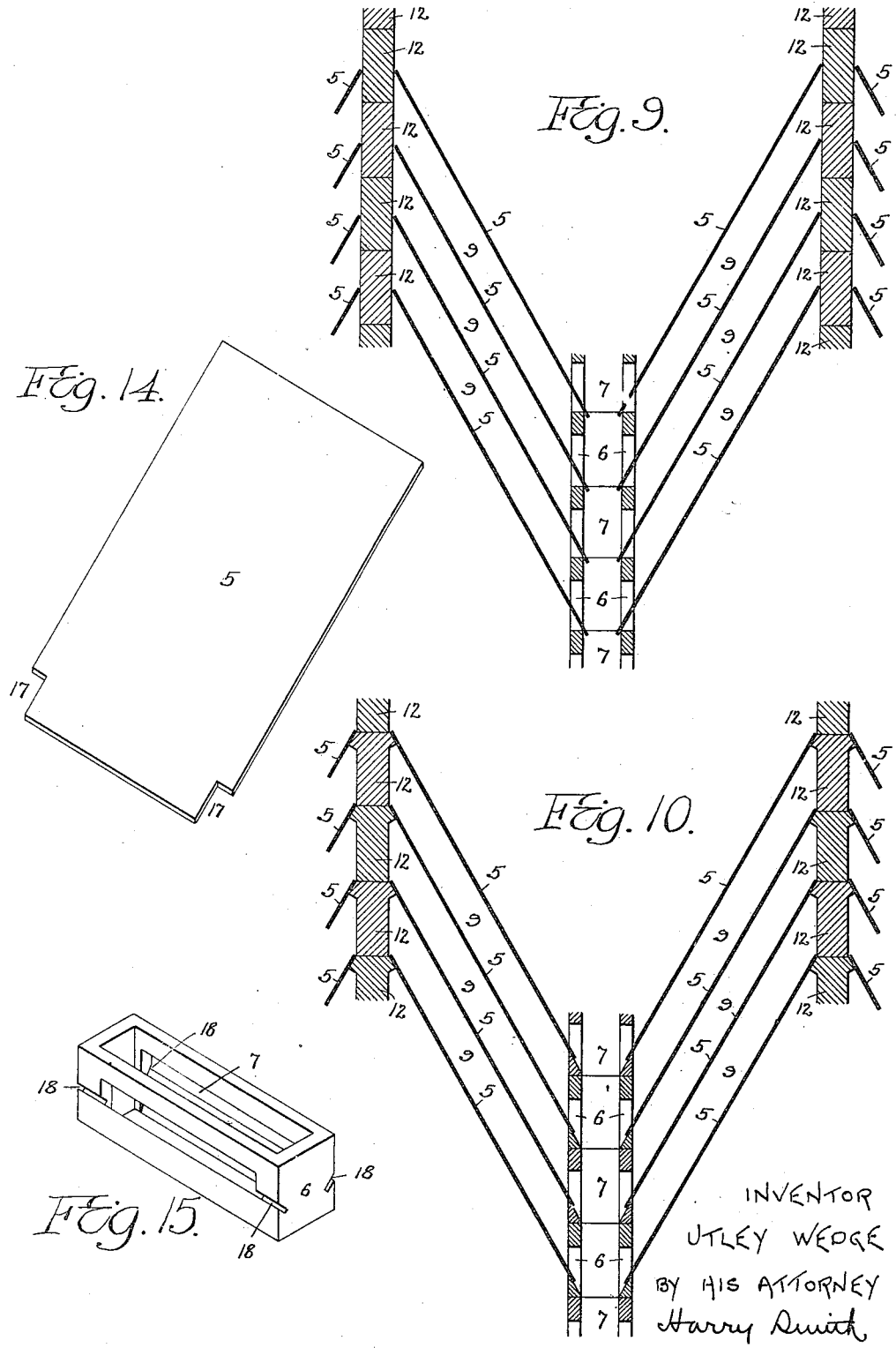
INVENTOR
UTLEY WEDGE
BY HIS ATTORNEY
Harry Smith U. WEDGE.
DEVICE FOR SEPARATING MATTER FROM A FLUID CONTAINING THE SAME.
APPLICATION FILED OCT. 26, 1916.
1,267,024.
Patented May 21, 1918.
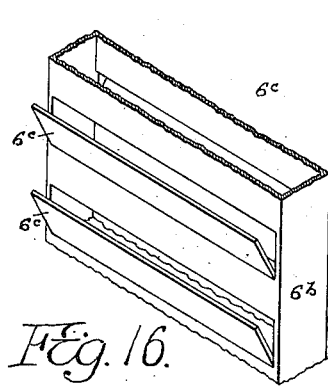
Fig. 16.
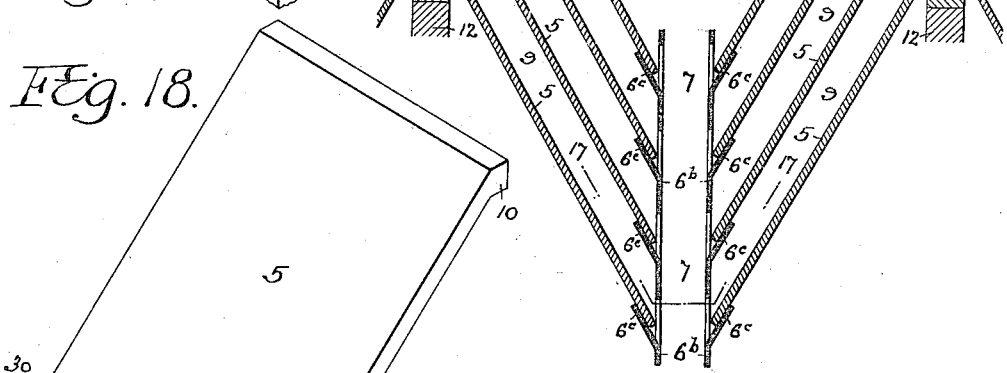
Fig. 11.
Fig. 18.
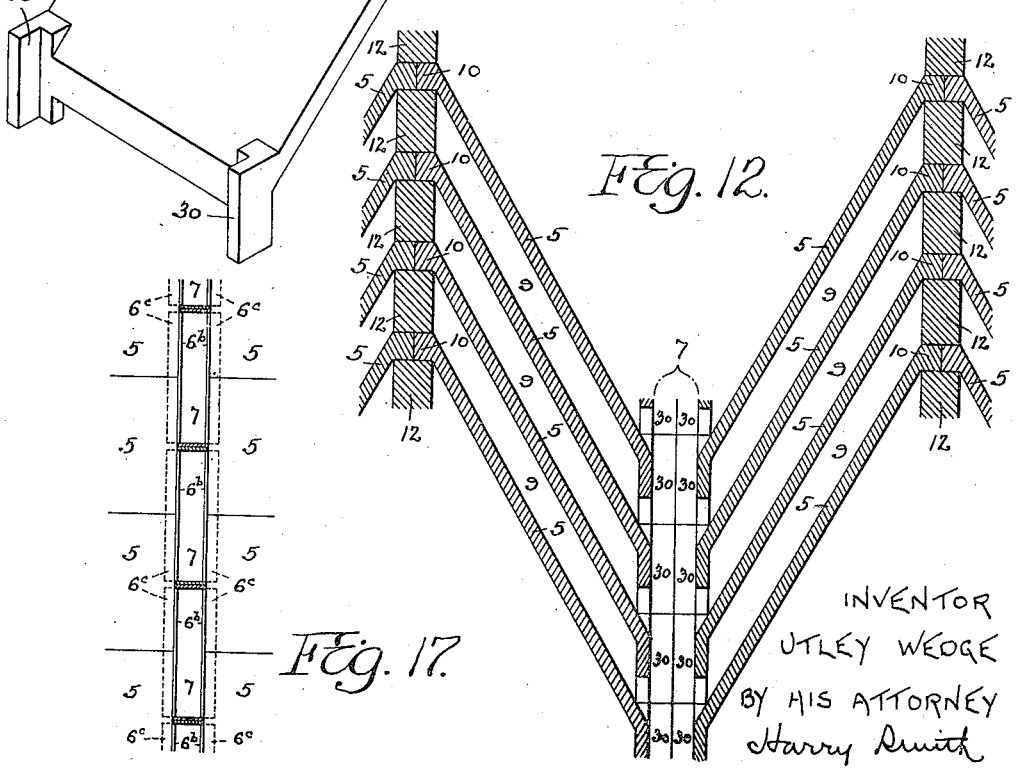
Fig. 12.
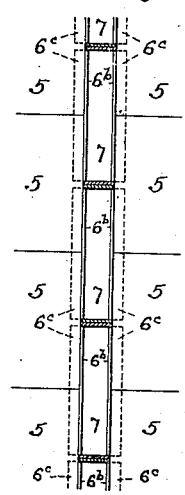
Fig. 17.
INVENTOR
UTLEY WEDGE
BY HIS ATTORNEY
Harry Smith

UNITED STATES PATENT OFFICE.

UTLEY WEDGE, OF ARDMORE, PENNSYLVANIA, ASSIGNOR TO THE PROCESS ENGINEERING COMPANY, OF PHILADELPHIA, PENNSYLVANIA, A CORPORATION OF PENNSYLVANIA.

DEVICE FOR SEPARATING MATTER FROM A FLUID CONTAINING THE SAME.

1,267,024. Specification of Letters Patent. Patented May 21, 1918.

Application filed October 26, 1916. Serial No. 127,821.

*To all whom it may concern:*

Be it known that I, UTLEY WEDGE, a citizen of the United States, residing in Ardmore, Montgomery County, Pennsylvania, have invented certain Improvements in Devices for Separating Matter from a Fluid Containing the Same, of which the following is a specification.

My invention consists of means for separating, by gravity, matter from a fluid carrying the same, including in this category solid or liquid particles contained in air or gases or the heavier of two elements contained in a flowing body of liquid. The main object of my invention is to so construct apparatus for this purpose that as soon as the separation has been effected the matter will be freed from the action of the moving fluid and will be permitted to fall without disturbance. Further objects are to facilitate the erection of the structure and to prevent injury thereto if the fluids passing through it are hot or of a corrosive character.

While my invention is thus of general application I have selected for the purpose of illustrating it a furnace dust separator such as that for which I obtained Letters Patent of the United States No. 1,165,351, on the 21st day of December, 1915.

In the accompanying drawings—

Fig. 2 is a horizontal section of the end portions of the same;

Fig. 3 is a view similar to part of Fig. 1, but on an enlarged scale;

Fig. 4 is a horizontal section on the line 4—4, Fig. 3;

Figs. 5 and 6 are perspective views of members employed in producing the structure shown in Figs. 1 to 4;

Figure 1:
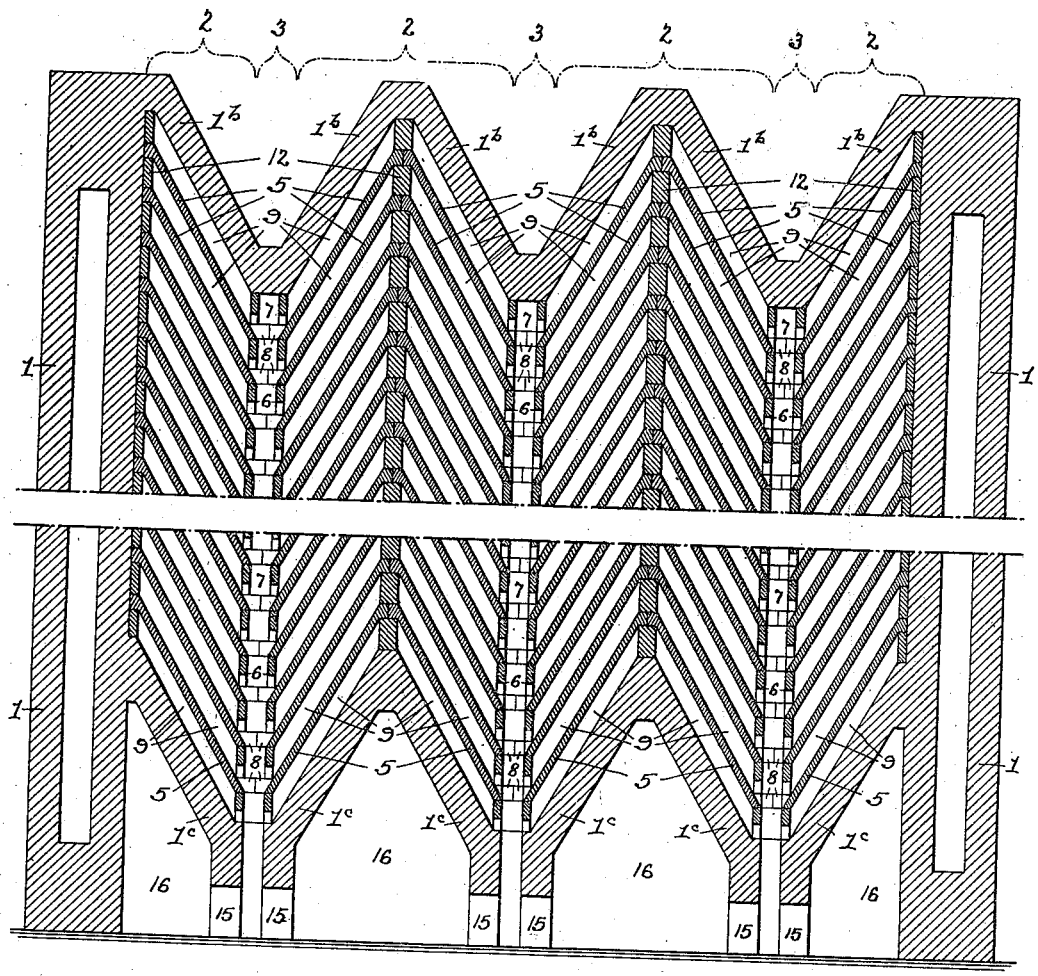
Figure 1 is a transverse section of the upper and lower portions of a furnace dust separator constructed in accordance with my present invention.

Figs. 7 to 12, inclusive, are views similar to Fig. 3, but illustrating modifications of my invention;

Fig. 13 is a horizontal section on the line 13—13, Fig. 8;

Fig. 14 is a perspective view of one of the members shown in Fig. 9;

Fig. 15 is a perspective view of the members shown in Fig. 10;

Fig. 16 is a perspective view of part of one of the members shown in Fig. 11;

Fig. 17 is a horizontal section on the line 17—17, Fig. 11, but on a reduced scale, and Fig. 18 is a perspective view of one of the members shown in Fig. 12.

The dust separator shown in the drawing is contained in a structure comprising side walls, 1, 1, end walls 1$^a$, top 1$^b$ and bottom 1$^c$, said structure inclosing a chamber 20 which receives the gases from a furnace 21, and discharges them through an opening 22 in the end wall 1$^a$, the gases passing through the chamber in the direction of the arrow Fig. 2.

In the chamber 20 are disposed dust receivers 2 and discharge chutes 3 alternating with one another throughout the width of the chamber, as shown in Fig. 2, and extending from top to bottom of the chamber, as shown in Fig. 1, each of said dust receivers being composed of members 5 disposed end to end throughout the length of the chamber 20, as shown in Fig. 2, and superposed and vertically separated, as shown in Fig. 1, so as to provide between them longitudinal flow passages 9 for the gases.

In like manner the discharge chutes are composed of members 6 disposed end to end throughout the length thereof and between the members 5 of the dust receivers. Each of the dust receiving members 5 consists of a slab, plate, or tile of refractory material inclined at such an angle in respect to the horizontal that dust deposited thereon will not accumulate to any material depth but will slide by gravity to the lower end of the member and will be delivered therefrom into the adjoining discharge chute. Each of the members 6 of each discharge chute is of rectangular form and has a vertical passage 7 therethrough, the members being disposed end to end, but not necessarily abutting, throughout the length of the chute and one or both of the side walls of each member being recessed at the bottom so as not to interfere with the free delivery of dust from the receiving members 5 into the passages 7.

By preference, each of the members 5 has, at each end, a toe 8, projecting laterally from the lower portion of the inclined upper face of said member, these toes resting upon the end walls of the corresponding chute member 6, as shown in Figs. 1 and 3. Each of the receiving members 5 also has at the top a flange 10 which projects laterally therefrom, in a reverse direction from the toes 8 and rests upon a spacing block or tile 12 interposed between said member and that below it, as also shown in Figs. 1 and 3.

Each dust receiver may consist of superposed and vertically separated courses each composed of members 5 inclined in the same direction, as shown in Fig. 7, in which case but one side of each of the chute members 6 need be recessed, the lower edges of the courses of one receiver registering with the upper edges of the courses of the adjoining receiver, and similar chute members 6 being used both at top and bottom of each of the flow passages 9.

I prefer, however, the duplex construction shown in Figs. 1 to 4, in which each dust receiver is composed of members 5 disposed back to back, those at one side being at a reverse angle from those at the other side and the chute members 6 being interposed only between the lower ends of said members 5, solid spacing blocks 12 being interposed between the abutting flanges 10 of successive courses, and the chute members 6 having both sides recessed for the passage of dust from the receiving members 5 to the passage 7.

In the construction shown in Figs. 8 and 13 the members 5ª of each course of the dust receiver present reversely angled sides integrally united at the top, the spacing blocks 12ª in such case having inverted V-shaped recesses at the bottom for fitting upon the apices of the members of the course below and inverted V-shaped tops for fitting against the under sides of the apices of the members of the course above. The chute members 6ª in this case are of cruciform cross section with vertical walls, the central longitudinal walls abutting at their ends and the central transverse walls bearing against the lower ends of the adjoining dust receiving members 5ª, so that the chute is divided by the longitudinal walls into right and left hand vertical chambers each of which is sub-divided by the transverse walls into passages 7ª each co-extensive with the dust receiving member 5ª with which it coacts, as shown in Fig. 13.

Each chute member 6ª may be divided vertically into sections corresponding to one or more of the courses of the dust receiver adjacent thereto, or each of said chute members 6ª may, if desired, extend from bottom to top of the chamber 20.

The chute members may be supported at the bottom upon the base portion 1ᶜ of the casing structure, and said chutes may communicate at the bottom through openings 15 with cleaning chambers 16 between the chutes, as shown in Fig. 1, or any other desired means of removing the deposited dust from the bottoms of the chutes may be adopted as convenience may suggest.

In Figs. 9 and 10 I have illustrated a structure in which the members 5 are flat plates.

In the structure shown in Fig. 9, these plates are supported vertically by resting at their lower ends upon the members 6 below them and are notched at the opposite corners, as shown at 17 in Fig. 14, so as to bear laterally upon the members 6 which thus serve to prevent said members 5 from sliding laterally. In the structure shown in Figs. 10 and 15 the lower end of the member 5 is seated in a notch 18 formed in the corresponding member 6 and rests at its upper end upon a beveled shoulder at the top of the spacing block 12.

In the modified structure shown in Figs. 11, 16 and 17, the members 5 are composed of simple flat plates, as in Figs. 9 and 10, but the chutes consist of rectangular tubes 6ᵇ disposed end to end and closed at the ends, as shown in Fig. 7, but having outwardly deflected side wings 6ᶜ which serve both as supports for the members 5 and to produce in the sides of the tubes the desired openings for the discharge of material from the members 5 into the passage 7 of the tube.

In the structure shown in Figs. 12 and 18 each of the members 5 has at the bottom a forwardly and downwardly projecting flange 30 at each edge, the forward edges of the flanges of the members 5 of one receiver abutting against those of the reversely inclined members of the adjoining receiver, and the flanges of the members 5 of one course resting upon those of the course below, as shown in Fig. 12, so as to properly support the superposed courses with intervening flow passages, and the flanges 30 extending so far below the bottom of each member 5 as to provide the necessary side opening for the flow of matter from the receivers 5 into the passage 7 of the chute member. In this structure the receiving members and chute members are integral.

When the dust receiving members 5, chute members 6 and separators 12 are of refractory material they are practically indestructible by heat, oxidation, or abrasion, hence the structure, once erected, will remain in operative condition indefinitely. The various members 5, 6 and 12 can be laid as readily as bricks, thus permitting ready dimensional expansion, and, if they are not cemented together they can be easily taken down again if the structure has to be dismantled in whole or in part.

In all cases the chute members form between adjoining sets of plates 5 discharge passages 7 which, except as to the side openings for the entrance of matter into said passages, are closed either against the escape of matter therefrom or the entrance thereto of fluid in motion from the flow passages 9, thus precluding any interruption in the steady flow of said matter to the bottom of the passage 7 after it has entered the same, and the side openings of the chute are vertically contracted as compared with the flow passages 9 with which they communicate, so that, while of sufficient area to permit of the passage of the separated matter from said flow passage 9 into the chute they will not permit waves or eddies of the moving fluid in the passage 9 to enter the chute, whereas in the separator shown in my former patent the passage between the adjoining sets of inclined plates was fully open to the flow passages between the plates themselves, and the fall of matter in said passage between the adjoining sets of plates was subject to constant interruption, hence matter after separation from the moving fluid was frequently carried back into the same and had to be again separated.

I claim:

1. The combination, in an apparatus for separating, by gravity, matter from fluid carrying the same, of a receiver and a discharge chute disposed side by side, said receiver presenting a surface at such an angle to the horizontal that matter deposited thereon will slide therefrom by gravity into the adjoining chute, the sides of the latter having therein openings for the passage of matter from the receiver into the chute, and said openings being vertically contracted as compared with the flow passages of the receiver with which they communicate.

2. The combination, in apparatus for separating, by gravity, matter from fluid carrying the same, of alternating receivers and discharge chutes, said receivers being composed of members inclined at such an angle to the horizontal as to cause matter deposited thereon to slide therefrom, by gravity, and said discharge chutes being composed of members having vertically contracted side openings for the delivery of matter from the receiving members into inclosed passages in said chute members.

3. The combination, in apparatus for separating, by gravity, matter from fluid carrying the same, of alternating receivers and discharge chutes, said receivers being composed of members presenting receiving surfaces inclined at such an angle to the horizontal as to cause matter deposited thereon to slide therefrom, by gravity, and said chutes being composed of members having closed ends and vertically contracted side openings through which matter can be delivered from corresponding receiving members to inclosed passages in the chute members.

4. The combination, in apparatus for separating, by gravity, matter from fluid carrying the same, of receivers and discharge chutes disposed side by side, said receivers presenting superposed and vertically separated courses with intervening flow passages, and being composed of members each inclined at such an angle in respect to the horizontal as to cause matter deposited thereupon to slide therefrom into an adjoining discharge chute, said members having, at their lower ends, toes projecting from the inclined surface and said discharge chute having members with end walls upon which said projecting toes are supported.

5. The combination, in apparatus for separating, by gravity, matter from fluid carrying the same, of receivers and discharge chutes disposed side by side, said receivers being composed of members disposed in superposed and vertically separated courses with intervening flow passages, and each inclined at such an angle in respect to the horizontal as to cause matter deposited thereupon to slide therefrom, by gravity, said members having, at the lower ends, toes projecting from the inclined surface and said discharge chute having members with vertical passages therethrough, end walls upon which said projecting toes are supported and side walls recessed for the passage of matter from the receiving members into said vertical passage.

6. The combination, in apparatus for separating, by gravity, matter from fluid carrying the same, of alternating receivers and discharge chutes, said receivers being composed of members disposed in superposed and vertically separated courses with intervening flow passages, and presenting receiving surfaces inclined at such an angle to the horizontal as to cause matter deposited thereon to slide therefrom, by gravity, chute members having vertical passages therethrough, and side openings through which matter is delivered to said passages from corresponding receiving members, said chute members being interposed between the lower ends of said receiving members, and filling pieces interposed between the upper ends of said receiving members.

7. The within described receiving member for apparatus for separating, by gravity, matter from fluid carrying the same, said member having a receiving surface inclined at such an angle in respect to the horizontal as to cause deposited matter to slide therefrom, by gravity, and having at each edge a toe projecting forwardly from the lower portion of the receiving surface.

8. The within described receiving member for apparatus for separating, by gravity, matter from fluid carrying the same, said member having a receiving surface inclined at such an angle in respect to the horizontal as to cause deposited matter to slide therefrom, by gravity, and having at each edge a toe projecting forwardly from the lower portion of the receiving surface and at the top a flange projecting in the opposite direction.

9. The within described chute forming member for apparatus for separating, by gravity, matter from fluid carrying the same, said member having a vertical passage therethrough, walls at the ends of said passage and walls at the sides thereof, both of said side walls being recessed at the bottom to permit flow of matter from the outside of the member into the vertical passage thereof.

In testimony whereof, I have signed my name to this specification.

UTLEY WEDGE.

Copies of this patent may be obtained for five cents each, by addressing the "Commissioner of Patents, Washington, D. C."